United States Patent
Huffman et al.

(10) Patent No.: US 7,536,102 B1
(45) Date of Patent: May 19, 2009

(54) METHOD AND APPARATUS FOR FIBER OPTIC FAULT LOCATING AND MAPPING

(75) Inventors: John Huffman, Conyers, GA (US); Hossein Eslambolchi, Los Altos Hills, CA (US)

(73) Assignee: AT&T Corp, New York, NY (US)

( * ) Notice: Subject to any disclaimer, the term of this patent is extended or adjusted under 35 U.S.C. 154(b) by 369 days.

(21) Appl. No.: 11/072,468

(22) Filed: Mar. 4, 2005

Related U.S. Application Data

(60) Provisional application No. 60/556,277, filed on Mar. 25, 2004.

(51) Int. Cl.
*H04B 10/08* (2006.01)
(52) U.S. Cl. .............................. 398/21; 398/13; 398/16; 398/31
(58) Field of Classification Search .................. 398/10, 398/13–17, 20, 21, 28, 30–32; 356/73.1
See application file for complete search history.

(56) References Cited

U.S. PATENT DOCUMENTS

| | | | | |
|---|---|---|---|---|
| 5,528,356 A | * | 6/1996 | Harcourt | 356/73.1 |
| 5,724,149 A | * | 3/1998 | Stallard et al. | 398/18 |
| 5,790,285 A | * | 8/1998 | Mock | 398/21 |
| 5,903,375 A | * | 5/1999 | Horiuchi et al. | 398/37 |
| 6,310,702 B1 | * | 10/2001 | Minami et al. | 398/13 |

* cited by examiner

Primary Examiner—Dalzid Singh

(57) ABSTRACT

In accordance with the teachings of the present invention, a method and apparatus is presented for troubleshooting a fiber-optic cable. A fiber-optic, cable-troubleshooting system includes an integrated Optical Time Domain Reflectometer (OTDR) for generating an optical distance to a fault and a cable-locating module for presenting a tone on a fiber-optic cable. A technician uses the tone to locate the fiber-optic cable and the optical distance to locate the fault in the fiber-optic cable.

8 Claims, 3 Drawing Sheets

METHOD AND APPARATUS FOR FIBER OPTIC FAULT LOCATING AND MAPPING

CROSS REFERENCE TO RELATED APPLICATIONS

This application is a continuation of provisional application Ser. No. 60/556,277 entitled "Fiber Optic Fault Locating and Mapping Device" filed on Mar. 25, 2004, the contents of which are incorporated herein by reference.

BACKGROUND OF THE INVENTION

1. Field of the Invention

The present invention relates to a fiber-optic fault locating and mapping device and, more specifically, to the use of a signaling tool in combination with cable locating equipment to accurately identify a fault location.

2. Description of the Prior Art

A variety of technologies are currently available for troubleshooting cable problems, such as cable breaks or cable faults. Each of these technologies serves a specific purpose and enables a technician to locate and isolate faults. For example, cable-locating equipment is currently used to locate a cable that may have a fault. Fault-locating equipment is currently used to locate a fault in a cable. Operators are traditionally trained in either cable-locating equipment or in fault-locating equipment.

A variety of different types of cables are deployed in communication systems. Some of the most notable are twisted pair cables, coaxial cables, and fiber-optic cables. Cable-locating equipment and fault-locating equipment are each individually used to troubleshoot particular types of cable systems; specifically, both technologies are individually used to troubleshoot fiber-optic cables.

A conventional fiber-optic cable consists of a plurality of fibers surrounded by a protective layer. The fibers are often bundled together and the protective layer surrounding the cables includes a variety of protective materials including a metal sheath. In conventional cable-locating equipment, a tone is communicated on the metal sheath so that a technician in the field can locate the fiber-optic cable. Approximately, every 50 miles or so, a cable-locating box is deployed on the cable. A tone is generated and communicated along the metal sheath of the cable. The technician is able to use equipment to detect the tone and ultimately locate the cable.

When a cable may be damaged, if there is no physical damage above ground, a technician cannot visually locate the cable. In conventional cable troubleshooting, the technician may use a transmitting device to dial into a cable-locating box and turn on the cable tone. Once the cable tone is turned on and is emanating from the cable, the technician may sweep the area in the general location of the cable to locate the cable. The technician can locate the cable using the signature of the tone. For example, when there is sheath damage in the cable, the cable tone either stops after the location of the sheath damage or diminishes after the location of the sheath damage. As a result, based on the level of the tone, the technician is able to locate the sheath damage.

However, it should be appreciated that it may take a substantial amount of time to locate the general area that the tone is emanating from since the range of conventional systems is about 25 miles. To precisely determine a cable location may take a substantial amount of time requiring that the technician traverse large areas. This of course increases the amount of time required to locate the cable and results in longer outage times for customers.

Another technology used to troubleshoot cable problems is an Optical Time Domain Reflectometer (OTDR). An OTDR transmits a light signal down a fiber and then measures the reflected light. When a fault or termination point occurs in a fiber, the light reflects off of the fault or termination point. For example, the OTDR collects irregularities from the fiber through signals reflected back from the fiber after a pulsed signal is placed on the fiber. These irregularities are averaged and plotted and will show any imperfections in the glass. The lasers used in an OTDR have a very broad spectrum and will only show the worst irregularity. On the other hand, a narrowly spaced laser will show all irregularities (i.e., those that are valid faults and those that are not). Therefore, it is sometimes difficult to tune the lasers to get the optimum laser spacing and fault detection.

Geographic maps are created when fiber-optic lines are installed, but often they are not representative of the actual installation. The OTDR can be used to measure the linear distance of the fault based on the time it takes the reflected light to return to the point of origin. However, with current OTDR systems, it is difficult to relate the OTDR reading to a geographic location. As a result, it is difficult to specifically isolate the fault.

Thus, although there are a variety of technologies deployed for troubleshooting cables, a better system for troubleshooting cables is needed.

SUMMARY OF THE INVENTION

A method and apparatus for locating a cable and isolating a fault is presented. In one embodiment, a method is presented that enables a technician to locate a cable and isolate a fault in the cable. An integrated cable-troubleshooting system that performs both cable location and fault isolation is presented. In one embodiment, the functionality of a cable tone-generator is integrated with the functionality of an Optical Time Domain Reflectometer (OTDR).

In one embodiment, an integrated cable-troubleshooting system is implemented. The cable-troubleshooting system includes an OTDR for monitoring a fiber-optic cable. The OTDR connects to the fiber-optic cable, which terminates at a fiber cabinet. If there is a fault at 10,000 feet, the OTDR scans the fiber. Fault information specifying the location of the fault is placed into an electronic message. When a technician dials into the integrated cable-troubleshooting system to turn on a cable locating tone, the electronic message would tell the technician that there is a fault at 10,000 feet.

Once the cable-locating module is turned on, a cable tone is transmitted down the sheath of the fiber-optic cable. The integrated cable-troubleshooting system has a communication interface (i.e., telephone access) that the technician can dial into. In one embodiment, the technician inputs a security code to access the cable-locating module and a code to turn on the cable-locating module. As such, the technician can turn the locating tone on and off. Using the combined information from the OTDR with the cable-locating tone, the technician is able to locate the cable and isolate the fault.

A cable-troubleshooting system comprises an OTDR generating fault location information detailing a distance of a fault in a fiber-optic cable. In one embodiment, the fault location information identifies a linear distance to a fault. The cable-troubleshooting system further comprises a cable-locating module that is coupled to the OTDR. The cable-locating module may be coupled to the OTDR through a communication path, a CPU, a memory, a communication interface, etc. The cable-locating module generates a tone on the fiber-optic cable, whereby the fault-location information in combination with the tone is used to locate the cable and isolate the fault.

In one embodiment, a technician may use the combined information to locate the cable. In another embodiment, a computer, robot, etc. may use the combined information to locate the cable and isolate the fault.

A method of operating a cable-troubleshooting system comprises the steps of detecting a fault in a fiber-optic cable in response to operating an OTDR; and generating a tone on the fiber-optic cable to identify the fiber-optic cable in response to detecting the fault on the fiber-cable.

A method of troubleshooting a fiber-optic cable comprises the steps of operating an OTDR to generate fault information; generating a signal in response to generating the fault information; and operating a cable-locating module in response to generating the signal.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
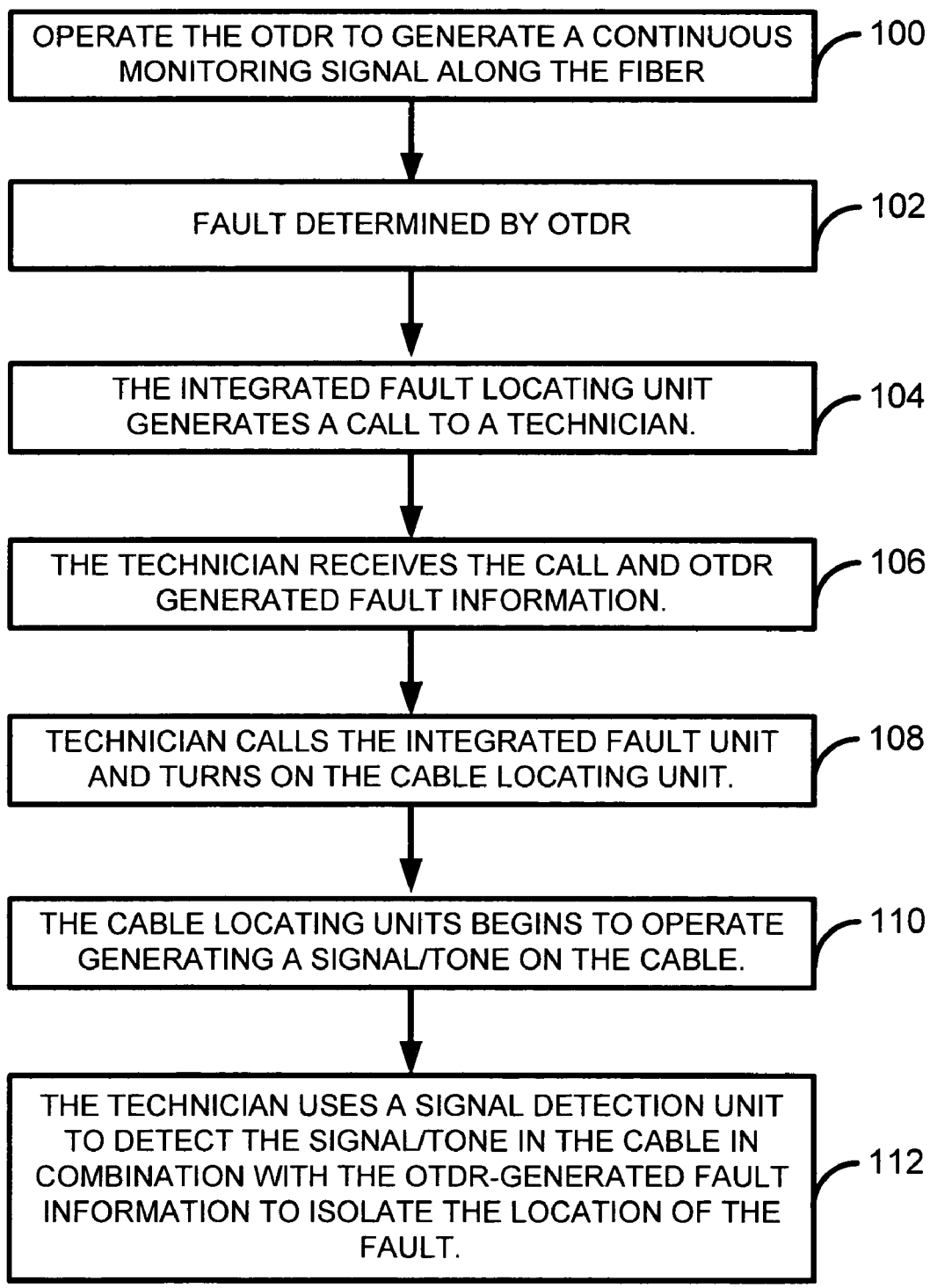
FIG. 1 displays a flow diagram implementing the teachings of the present invention.

FIG. 1 displays a flow diagram implementing the teachings of the present invention. Using an integrated cable-troubleshooting system, at step 100, an OTDR is placed into operation to generate a continuous monitoring signal on a fiber-optic cable. At step 102, the OTDR identifies a fault and records the fault information (i.e., distance to the fault location, time of fault, type of fault, etc.). The cable-troubleshooting system communicates the fault information to a technician as stated at 104. The communication may be a landline communication, a wireless communication, a computer communication, etc. In one embodiment, an electronic communication, such as an email message or wireless telephone call including the fault information, is sent to the technician.

The technician receives the call and the fault information generated by the OTDR as stated at 106. The technician places a call to the integrated cable-troubleshooting system and turns on a cable-locating module implemented in the integrated cable-troubleshooting system as stated at 108. At step 110, the cable-locating module begins to operate generating a signal/tone on the cable. At step 112, the technician uses a signal detection unit to detect the signal/tone in combination with the OTDR-generated fault information to isolate the location of the cable and the fault in the cable.

Figure 2:
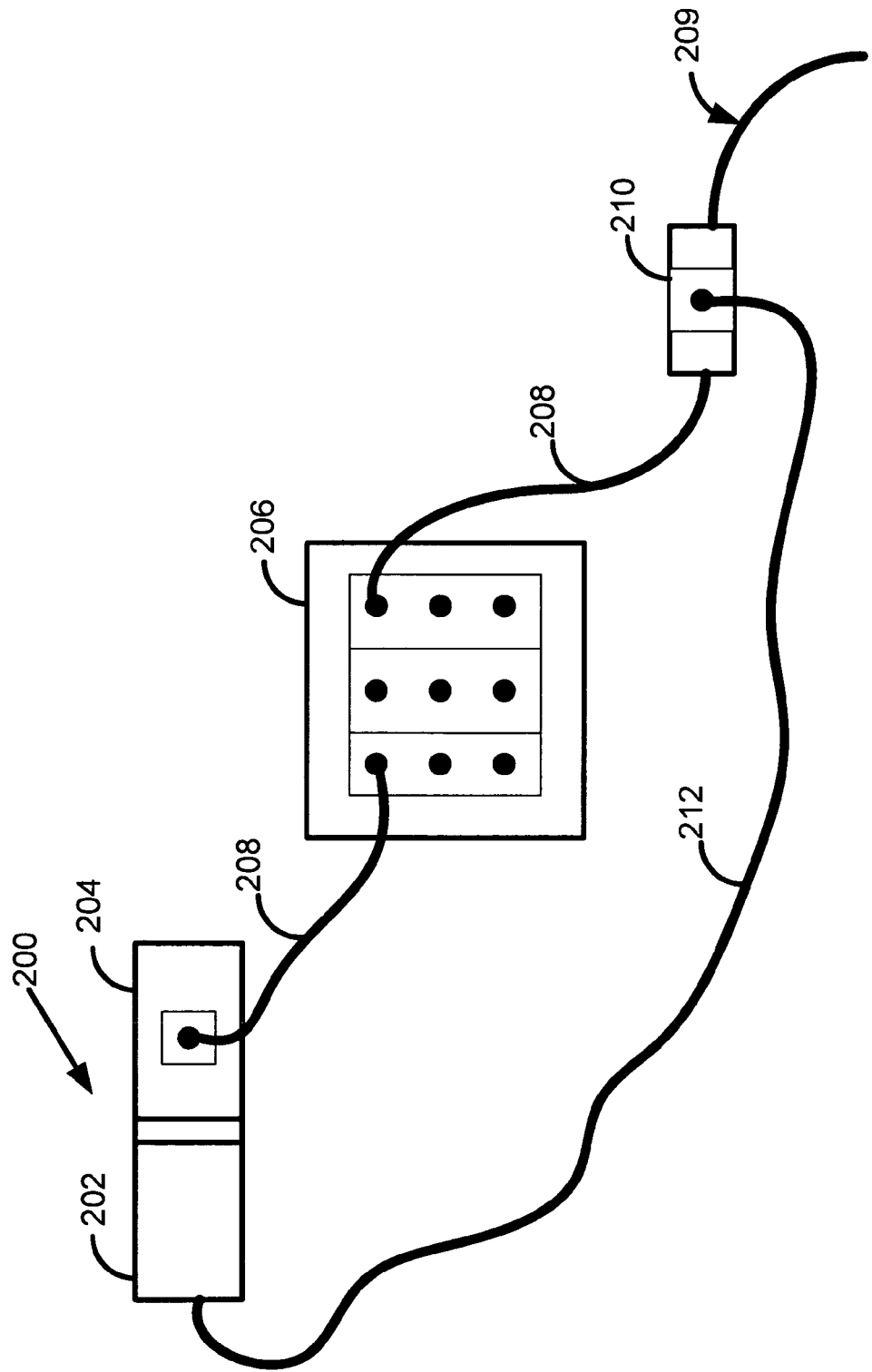
FIG. 2 displays a network implementing the teachings of the present invention.

FIG. 2 displays a network implementing the teachings of the present invention. A cable-troubleshooting system 200 includes a cable-locating module 202 and an OTDR 204. A fiber-optic cable 208 is shown. The fiber-optic cable 208 is connected through a fiber termination panel 206. The cable-locating module 202 is connected to a cable-locating unit 210 through a connection cable 212. The cable-locating unit 210 is connected to the sheath of the fiber-optic cable 208.

During operation, a fault may occur at a location designated by 209. The fault may occur for a variety of reasons. The OTDR 204 continuously sends a signal down the fiber-optic cable 208. Therefore, when the fault shown at location 209 occurs, the OTDR 204 will be able to detect the location shown as 209 and the optical distance of the fault location at 209. In another embodiment, if there is a cut in the fiber-optic cable 208, the OTDR 204 would immediately raise an alarm and report the optical distance to the cable-locating module 202, where this information could be given to a technician calling in to the integrated cable-troubleshooting system 200. In the alternative, the OTDR 204 may trigger the operation of the cable-locating module 202, upon detection of a fault. In yet another embodiment, either the OTDR 204 or the cable-locating module 202 may generate a call to the technician making the technician aware of the problem. For example, the OTDR 204 may contact the technician immediately after identifying a fault. The OTDR 204 may turn on the cable-locating module 202 and then contact the technician after turning on the cable-locating module 202. In another embodiment, after identifying a fault, the OTDR 204 may turn on the cable-locating module 202 and then the cable-locating module 202 may initiate the call to the technician with the required fault information from the OTDR 204. In another embodiment, the OTDR 204 and/or the cable-locating module 202 may communicate with the integrated cable-troubleshooting system 200 and the cable-troubleshooting system 200 may communicate with the technician. It should be appreciated that a variety of permutations and combinations are possible and each is contemplated and within the scope of the present invention.

Irrespective of which of the foregoing methods is used, the response provides a significant improvement over the standard restoration objective set for restoring a cable of 2.5 hours. The technician may then drive to the apparent geographic location of the fault based on the information generated via the cable-troubleshooting system 200. When the technician arrives, an acoustic signaling tool can be used to generate a signal from above ground that is picked up by the cable-locating module 210. In one embodiment, when combined with the fault information, an accuracy of less than 30 feet may be experienced. For example, if the fault was 10,000 feet away from the fiber termination panel 206 and the technician was at 7,000 feet, the cable-troubleshooting system 200 would provide the information "you are 3,000 feet from the fault" in the electronic message. This process will continue until the technician is at the damage site and will lead the technician quickly and directly to the fault. Moreover, the process is not dependent on the accuracy of cable location drawings or a technician's ability to interpret the various milestones on the drawings.

In another embodiment, a technician can find the general path of the fiber-optic cable 208 by using the cable-location unit 210. The cable location unit 210 will direct the technician to the location of the fiber-optic cable 208, but no other information is provided. For example, the technician can locate the fiber-optic cable 208 by calling the cable-locating module 202 via a telephone and turning on the cable-locating module 202, which will generate a tone that will travel down the fiber-optic cable's 208 metallic sheath. Once the cable has been located, the technician can use the fault information provided by the OTDR 204.

In one embodiment, the cable-troubleshooting system 200 includes a narrow pulsed laser (i.e., OTDR 204). Footage from the fiber termination panel 206 to the fault location 209 can be recorded via the cable-troubleshooting system 200 and the technician can call into the cable-troubleshooting system 200 (i.e., OTDR 204 or cable-locating module 202) to obtain fault location information. Once this information is obtained, the technician must travel along the right of way to find the fault location 209. Often there is no obvious disturbance above ground at the fault location 209. The optical distance given by the OTDR 204 may not be the same as the geographical location along the fiber path. A known disturbance device (oscillator) can be used by the technician to generate a signal along the fiber path, and the OTDR 204 can detect this signal. The location of the disturbance can be compared to the end of fiber and calculations can be made to show the relationship of the known disturbance to the end of the fiber. This will aid the technician in locating a fiber fault location 209 and ultimately enable a geographic location to be determined.

Figure 3:
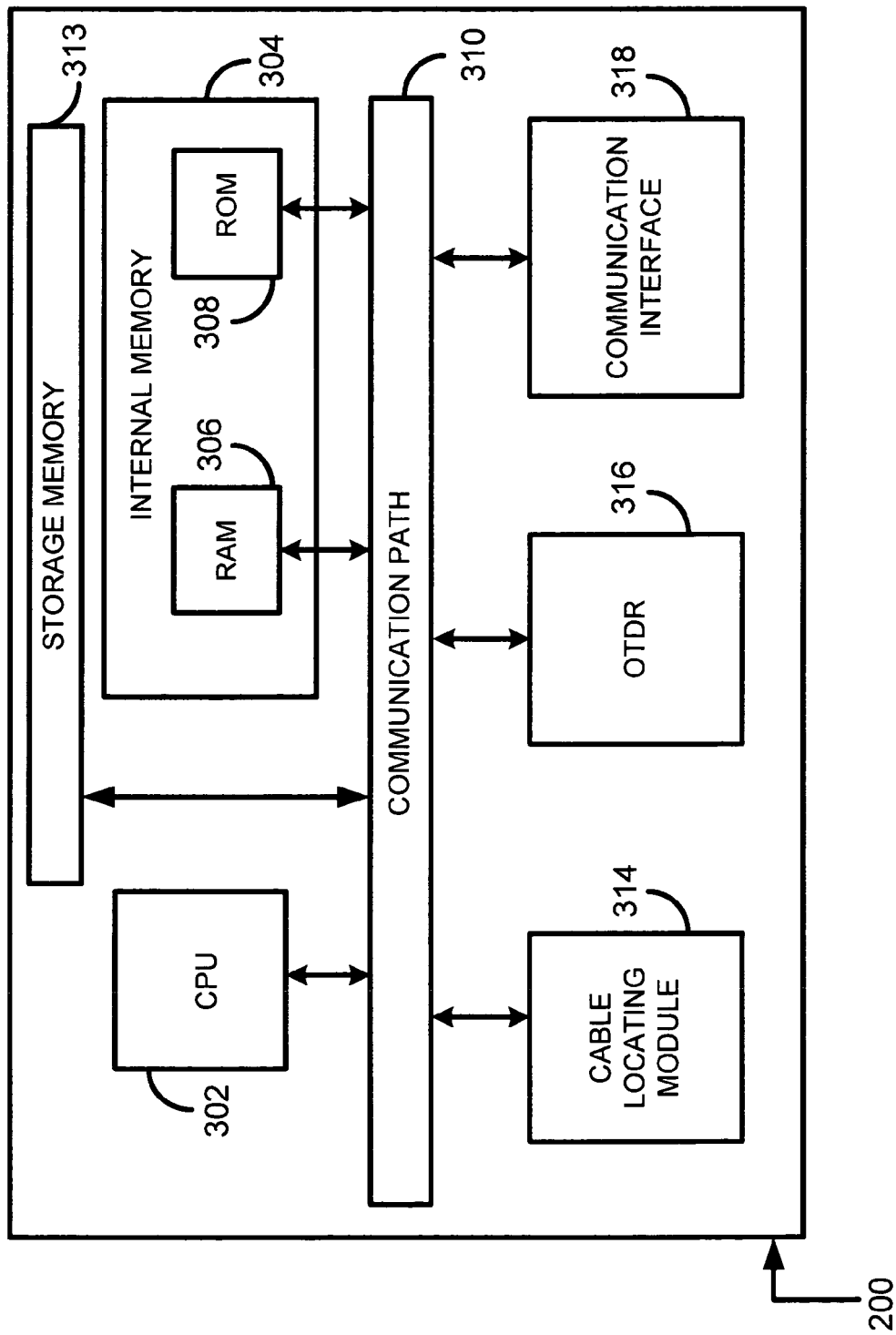
FIG. 3 displays an integrated cable-locating and fault-locating assembly.

FIG. 3 displays a cable-troubleshooting system 200. The cable-troubleshooting system 200 includes a cable-locating module 314 and an OTDR 316. The cable-locating module 314 includes all of the functionality required to generate a locating tone on a cable sheath. The cable-locating module 314 may be implemented in hardware and/or software and may represent an entire cable-locating module including the necessary functionality of a cable-locating module. For example, the cable-locating module 314 may include the memory, communication interface, CPU, etc. necessary to fully operate as a cable-locating module 314. In the alternative, the cable-locating module 314 may share the CPU 302, memories 313 and 304, and communication interface 318 with the OTDR 316.

The OTDR 316 may be implemented in hardware and/or software and may include the entire functionality required to operate as an OTDR. For example, the OTDR 316 may include the memory communication interface, CPU, etc. necessary to fully operate as an OTDR. In the alternative, the OTDR 316 may share the CPU 302, memories 313 and 304, and communication interface 318 with the cable-locating module 314.

In one embodiment, the CPU 302 may direct all operation of the cable-troubleshooting system 200 using instructions stored in storage memory 313 and/or internal memory 304. In another embodiment, CPU 302 may coordinate operation of a CPU (not shown in FIG. 3) located in the cable-locating module 314 and a CPU (not shown in FIG. 3) located in the OTDR 316. Communication path 310 provides communication for the various components in the cable-troubleshooting system 200. For example, after detecting a fault with the OTDR 316, an operation signal may be sent across the communication path 310 to the cable-locating module 314 to turn on the cable-locating module 314. In one embodiment, both the cable-locating module 314 and the OTDR 316 may communicate through the communication interface 318. In addition, instructions that direct cable-locating module 314 and OTDR 316 may be stored in the storage memory 313 and the internal memory 304.

cable-troubleshooting system 200 may operate using a variety of methods and still remain within the scope of the present invention. For example, a) the cable-locating module 314 and the OTDR 316 may each work autonomously; b) the cable-locating module 314 and the OTDR 316 may work cooperatively; c) the cable-locating module 314 and the OTDR 316 automatically work together.

In a first embodiment, the cable-locating module 314 and the OTDR 316 may each work autonomously. For example, during operation, the OTDR 316 may continuously monitor a fiber-optic cable. Once a fault is identified, the OTDR 316 may store the fault information, such as distance to the fault in the OTDR 316. The OTDR 316 may then communicate this information through the communication path 310 to the communication interface 318. The communication interface 318 may communicate this information to a technician. The technician may then dial into the cable-troubleshooting system 200 through the communication interface 318. The technician may enter an access code and a security code. The communication interface 318 may communicate the security code across the communication path 310 to the cable-locating module 314 and turn on a cable tone in the fiber-optic cable. Using the cable-locating tone, the technician is able to locate the fiber-optic cable and using the fault information from the OTDR 316, locate the fault in the cable.

In a second embodiment, the cable-locating module 314 and the OTDR 316 may each work cooperatively. For example, during operation, the OTDR 316 may continuously monitor a fiber-optic cable. Once a fault is identified, the OTDR 316 may store the fault information, such as the optical distance to the fault in the OTDR 316. The OTDR 316 may then communicate this information through the communication path 310 to the communication interface 318. In addition, the OTDR 316 may communicate information across the communication path 310 and turn on the cable-locating module 314. The communication interface 318 may communicate the optical distance information and "cable locating module—on" status information to a technician. Using the cable-locating tone, the technician is able to locate the fiber-optic cable and using the fault information from the OTDR, the technician is able to locate the fault in the cable.

In a third embodiment, the cable-locating module 314 and the OTDR 316 automatically work together. For example, automated procedures may be used to operate the OTDR 316. Instructions directing the automated procedures may be found in RAM 306, ROM 308, and storage memory 313. A CPU 302 may control the operation of the OTDR 316 based on these automated procedures. The automated procedures may include procedures to change the start/stop time of the OTDR 316, procedures to adjust the performance of the OTDR 316, procedures to log measurements of the OTDR 316 into memory and then respond accordingly, etc.

During operation, the OTDR 316 may continuously monitor a fiber-optic cable. Once a fault is identified, the OTDR 316 may store the fault information, such as the optical distance to the fault in the internal memory 304 or in a storage memory 313. Under direction of the CPU 302, the OTDR 316 may then communicate this information through the communication path 310 to the communication interface 318. In addition, the CPU 302 may then direct the communication of information across the communication path 310 and turn on the cable-locating module 314. The CPU 302 may control the operation of the cable-locating module 314 based on automated procedures. The automated procedures may include procedures to change the starustop time of the cable-locating module 314, procedures to adjust the performance of the cable-locating module 314, procedures to log the operation of the cable-locating module 314 into memory and then respond accordingly, etc. The communication interface 318 may communicate the optical distance information and "cable locating unit—on" status information to a technician. Using the cable locating tone, the technician is able to locate the fiber cable and using the fault information from the OTDR, the technician is able to locate the fault in the cable.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A method of troubleshooting a fiber-optic cable, comprising the steps of:
    operating an OTDR to generate fault information;
    generating a signal in response to generating the fault information; and
    operating a cable-locating module in response to generating the signal, including placing a cable locating tone on a metallic sheath of the fiber optic cable, the tone emanating from the cable for locating the cable using a signal detection unit.

2. A method of troubleshooting a fiber-optic cable as set forth in claim 1, further comprising a step of communicating the fault information to a technician.

3. A method of troubleshooting a fiber-optic cable as set forth in claim 1, further comprising a step of communicating the fault information to the technician before generating the signal.

4. A method of troubleshooting a fiber-optic cable as set forth in claim 1, further comprising a step of communicating the fault information to the technician after generating the signal.

5. A method of troubleshooting a fiber-optic cable as set forth in claim 1, further comprising a step of receiving a code to operate the cable-locating module and operating the cable-locating module in response to generating the signal and in response to receiving the code to operate the cable-locating module.

6. A method of troubleshooting a fiber-optic cable as set forth in claim 1, further comprising a step of storing the fault information, accessing instructions, and performing the step of generating the signal in response to the instruction.

7. A method of troubleshooting a fiber-optic cable as set forth in claim 1, further comprising a step of accessing instructions from a memory and operating the OTDR to generate fault information; generating the signal; and operating the cable locating module in response to the instructions.

8. A method of troubleshooting a fiber-optic cable as set forth in claim 1, further comprising a step of receiving operation information through a communication interface and operating the OTDR and the cable-locating module in response to receiving the information through the communication interface.

* * * * *